Patented Oct. 29, 1935

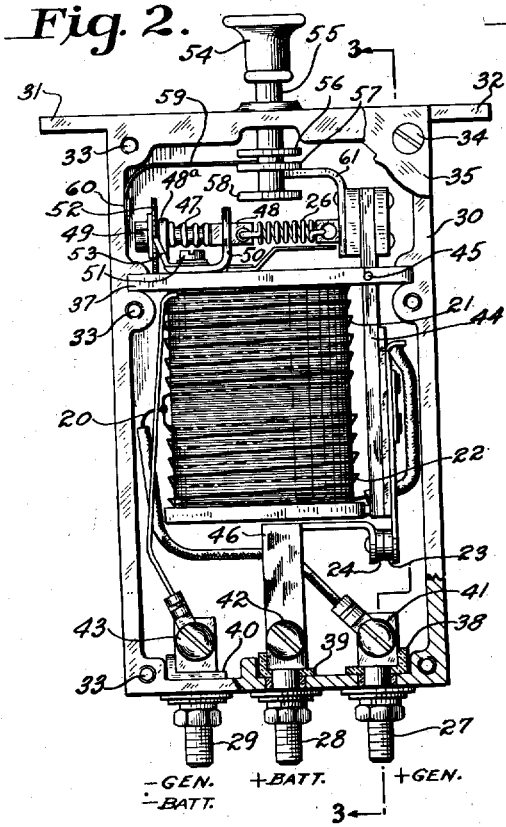
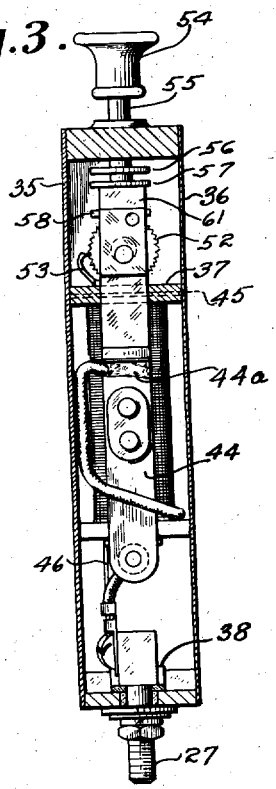
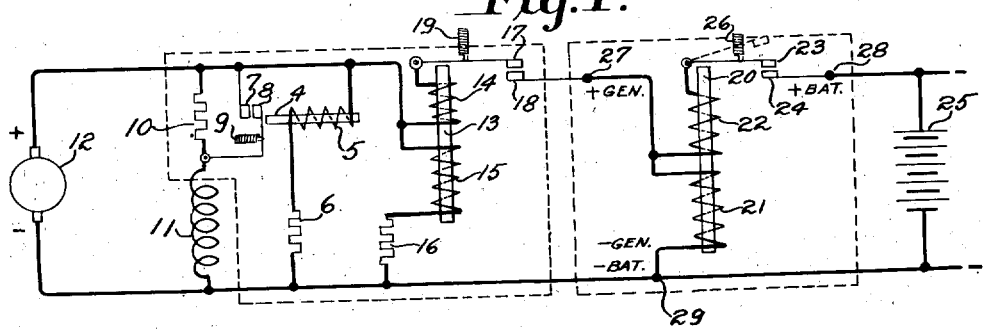

2,019,430

UNITED STATES PATENT OFFICE 2,019,430

ELECTRICAL APPARATUS

Charles I. McNeil, Bloomfield, N. J., assignor to Eclipse Aviation Corporation, East Orange, N. J., a corporation of New Jersey Application September 13, 1930, Serial No. 481,755

13 Claims. (Cl. 171—314)

The present invention relates to electrical circuit arrangements for charging systems, and more particularly to a novel arrangement for charging circuits wherein a reverse current relay or cut-out is employed to open a generator circuit when the voltage of the generator becomes less than that of the battery to prevent discharging of the latter.

It has been found in practice that the reverse current relay or cut-out employed in systems of the above type does not always function in the intended manner, due to the fact that the apparatus is occasionally subjected to a severe jolt, as for example when employed on an aircraft and at the instant of landing, which causes the armature of the reverse current relay to close accidentally, thereby allowing a heavy current to pass through the series coil of the relay, resulting in the armature being held closed by the flux produced by said current which flows from the battery through said series coil after the generator voltage has fallen below that of the battery due to the generator speed decreasing under these conditions.

Therefore, one of the objects of the present invention is to provide novel circuit means whereby the above and other difficulties are overcome and the reverse current relay is made to function in the intended manner.

Another object is to provide in a charging circuit, a novel circuit arrangement including a reverse current relay or cut-out and a multi-coil electro-magnet, the various coils of which are so arranged and combined as to insure proper operation of the circuit regardless of the electrical condition of the relay.

A further object is to provide a novel circuit including a reverse current relay or cut-out and a novel switch embodying an electro-magnet provided with a plurality of coils whereby the contacts of the relay, if closed accidentally, are prevented from remaining closed.

Another object is to provide a novel charging circuit including in combination, a reverse current relay and a novel switch whereby said circuit is automatically opened when the generator voltage falls below the battery voltage to prevent battery current from flowing through the relay if the latter be closed accidentally, thereby preventing said relay from remaining closed.

Another object is to provide in a charging circuit, novel arrangement whereby said circuit is automatically opened when the generator voltage drops below that of the battery being charged, and caused to remain open.

A further object is to provide in a charging circuit for motor vehicles, a novel arrangement whereby said circuit must initially be closed manually and thereafter opened automatically when the generator voltage falls below the battery voltage, and caused to remain open until manually re-closed.

A still further object is to provide in a charging circuit for motor vehicles, a novel arrangement whereby said circuit is opened automatically when the generator voltage falls below the battery voltage and thereafter prevented from accidental closure and whereby said circuit may be manually closed and opened at the will of the operator of the vehicle.

Still another object is to provide a novel and improved automatic safety switch adapted for use in charging circuits on motor vehicles such as airplanes and automobiles.

The above and other objects and advantages of the invention will appear more fully hereinafter from consideration of the detailed description which follows, together with the accompanying drawing, wherein is illustrated one embodiment of the invention. It is to be expressly understood, however, that the drawing is for the purpose of description only, and is not designed as a definition of the limits of the invention, reference being had for this purpose to the appended claims.

In the drawing, wherein like reference characters refer to like parts throughout the several views, Fig. 1 is a schematic circuit arrangement which includes, among other elements, switch mechanism embodying the present invention;

Fig. 2 is a front elevation, partially in section, with parts broken away, of one form of switch adapted to be employed in accordance with the invention; and Fig. 3 is a partially sectional side view thereof taken on line 3—3 of Fig. 2.

Referring now to Fig. 1, the embodiment of the invention illustrated therein is employed in a circuit including a direct-current generator provided with the usual voltage regulator and a reverse current relay or cut-out adapted to function in the usual manner in charging a storage battery, such as is generally employed for providing electrical energy for starting and lighting of a motor vehicle and for operating other auxiliary apparatus as is generally provided on such vehicles.

In the form shown, the voltage regulator comprises the usual solenoid 4 provided with a shunt or voltage winding 5 in series with a protective resistance 6, said solenoid being adapted upon energization of the coil 5 to open contacts 7 and 8, which are normally held closed by a spring 9, thereby placing a resistance 10 in series with the shunt field winding 11 of the generator 12. The tension of the spring 9 is adjusted so that upon the rise of the voltage from the generator 12 above a predetermined value, the contacts 7 and 8 are opened, thereby causing resistance 10 to decrease the current flow in field winding 11, thus reducing the speed of the generator and decreasing the voltage thereof.

The reverse current relay or cut-out, which is provided for preventing the battery from discharging when the generator voltage drops below the battery voltage due to a decrease in generator speed or for any other reason, comprises the usual solenoid 13 provided with a series winding 14 and shunt winding 15. A protective resistance 16 is placed in series with the shunt winding 15. Windings 14 and 15 are wound in such a manner that when current flows therethrough from the generator their flux is cumulative, thereby holding the contacts 17 and 18 closed against the tension of spring 19, but when the current flows from the battery to the generator due to the voltage of the latter being greater than that of the generator, the magneto-motive forces of the coils oppose each other, thereby causing the contacts 17 and 18 to be opened by the spring 19. As is understood in the art, coil 15 functions to initially close the contacts 17 and 18, whereby current is then caused to flow through coil 14, thus aiding the coil 15 in keeping said contacts closed.

As pointed out hereinbefore, it has been found in practice that a reverse current relay or cut-out does not always function in the intended manner due to the fact that the contacts 17 and 18 are occasionally closed accidentally when the motor vehicle on which the device is mounted is subjected to a severe jolt, thereby causing a heavy current to flow from the battery through the coil 14 and resulting in the contacts 17 and 18 being held closed by the flux produced in said coil. Means are therefore provided whereby the battery circuit is automatically opened and held opened when the generator voltage falls below that of the battery, thus preventing any battery current from flowing through the series coil of the reverse current relay if the latter be closed accidentally, which would tend to hold it closed and cause discharging of the battery and possibly a burning out of the generator due to said battery current flowing therethrough.

In the form shown, said means comprises an electro-magnet or solenoid 20 provided with a shunt winding 21 and a series winding 22 which correspond to windings 15 and 14, respectively, of the reverse current relay and are adapted to hold contacts 23 and 24 closed when the battery 25 is being charged by the generator and are wound in a manner similar to that of coils 15 and 14, so that when the generator voltage drops, current from the battery 25 flowing through said coils is in opposite directions, thereby causing spring 26 to open the contacts 23 and 24 at the same time that contacts 17 and 18 are opened by spring 19 and the action of coils 14 and 15. This device differs from a reverse current relay in that the tension of spring 26 is of such a value as to prevent the contacts 23 and 24 from closing only by attraction of the armature due to generator current passing through coil 21, and the contacts 23 and 24 must initially be closed manually against the tension of said spring, whereupon generator current flows through coil 22 and the flux produced therein is in the same direction as that of coil 21, thereby causing the solenoid 20 to hold said contacts closed.

It will therefore be apparent that before the system can operate, contacts 23 and 24 must be closed manually, but when once closed they will be held closed by the combined action of coils 21 and 22. Due to the tension of the spring 26, accidental closure of the contacts cannot occur after they are opened, as may happen in the case of the reverse current relay, in which the tension of the spring 19 is much lower and insufficient to prevent the contacts 17 and 18 coming together when the vehicle on which the relay is carried is subjected to a jolt or jar. Spring 19 must, of necessity, be made light in order that the relay function properly, because if the tension of said spring were increased the energization of the coil 15 would be insufficient to close the contacts when necessary. Contacts 23 and 24 of the novel switch are arranged so that they may also be opened manually as well as automatically, if desired, at the will of the operator of the motor vehicle upon which said switch is mounted, which will be pointed out more particularly in connection with Figs. 2 and 3.

The device is provided with three terminals 27, 28, and 29, the first two of which are adapted to be connected to the plus or positive side of the generator and the positive side of the battery, respectively, and the third to the negative side of the generator and the negative side of the battery.

Referring now to Figs. 2 and 3, which show one form of mechanical embodiment of the invention, the device illustrated therein comprises a rectangular frame 30 provided with integral flanges 31 and 32 at one end thereof for securing the device to the instrument panel of an aircraft or the dashboard of an automobile. Threaded apertures 33 are formed in the frame for receiving screws 34 by means of which a pair of cover-plates 35 and 36 are secured to the frame. The core 20, on which are wound the coils 21 and 22, is carried by a rectangular member or shelf 37 which is pressed into the frame either from the front or the rear thereof, and also carries an adjusting mechanism to be described hereinafter. Terminals 27, 28, and 29 extend from and pass through the other end of the frame and are insulated therefrom by means of bushings 38, 39, and 40 of some suitable insulating material, such as fibre, bakelite, or the like. The inner ends of the terminals are provided with binding posts 41, 42, and 43, respectively, for connecting the coils 21 and 22 and contact 24 thereto.

The movable contact 23 is carried by an armature 44 positioned parallel with and longitudinally of the coils and is pivoted by means of a pin 45 passing therethrough and supported in the shelf 37. Coil 22 may be connected to armature 44 in any suitable manner, as by soldering the end thereof to said armature as indicated at 44a. Fixed contact 24 is carried by a bracket 46 of some suitable conducting material, such as brass or copper, which is rigidly secured to the terminal 28 by means of the screw of the binding post 42. When the coils 21 and 22 are energized, the magnetic path of the flux produced thereby is from the core 20 through the shelf 37, the armature 44, and back to the core 20. It will be apparent that upon energization of the coils the armature 44 will be attracted to the left by the core 20, thereby closing the contacts 23 and 24 against the tension of the spring 26, which is secured to one end of said armature.

Means are provided for adjusting the tension of the spring 26, and in the form shown comprise a threaded member 47 having a square end piece 48 formed integral therewith to which spring 26 is secured. Threaded member 47 is carried by a bracket 48a provided with a threaded aperture through which the member 47 passes and by means of which said member is adapted to be moved either to the right to decrease the tension on the spring 26, or to the left to increase the tension by rotating the head 49 of the member 47. Guide member 50 is secured to the shelf 37 by suitable means such as a screw 51 and serves to guide the end piece 48 and also to support the latter. In order to prevent any change in the adjustment, a ratchet wheel 52 is provided which is carried by the threaded member 47 concentrically therewith and is adapted to be engaged by a pawl 53, the latter being secured to the bracket 50 by means of screw 51. The teeth on the ratchet wheel are arranged to provide rotation thereof in either direction against the pressure of the pawl 53 but prevented from rotation by the latter until some external force is applied thereto, as by means of rotation of the head 49 of the threaded member 47. It will be apparent from this construction that once an adjustment is made it will be maintained until altered by manipulation of the threaded member 47.

Means are also provided for manually closing and opening the contacts 23 and 24 at the will of the operator, and in the form shown comprise a knob 54 secured to or made integral with a rod 55 which passes through an aperture formed in that portion of the frame 30 which is adapted to lie on the face of the instrument panel. The rod is provided with a set of collars or discs 56, 57, and 58 spaced apart from each other therealong. A leaf spring 59 is secured at its one end to the frame 30, as by means of a rivet 60, and has its free end interposed between the collars 56 and 57 whereby, upon inward and outward movement of the knob 54, the latter is returned to its normal position, as indicated in Fig. 2. The collar 57 is positioned on the rod 55 so that when the contacts 23 and 24 are closed it bears against an angular projection 61 secured to the end of the armature 44 opposite from that which carries the fixed contact 23, whereby upon an inward push of knob 54 the contacts 23—24 may be opened. The collar 58 is positioned on the end of the rod 55 so that upon an outward movement of the knob 54 it engages the projection 61 and causes the armature 44 to move on its pivot pin 45 to close the contacts 23 and 24.

The operation of the device is as follows: When the engine of the motor vehicle on which the device is mounted is started the generator 12 is rotated thereby and current from the latter flows through the shunt coil 15, causing energization of the reverse current relay to close the contacts 17 and 18. No current flows through series coil 14 until contacts 23 and 24 are closed manually when it is desired to charge the battery 25. To close said contacts, knob 54 is pulled outward, causing current from the generator to pass through coils 21 and 22, thereby producing a flux which tends to hold said contacts in closed position. Contacts 17 and 18, being closed, cause current to flow through coil 14, thereby increasing the flux in the reverse current relay to maintain said contacts in closed position.

The novel switch of the invention functions in a manner similar to the reverse current relay except that it must be closed manually, while the relay closes automatically, but both are adapted to be opened automatically and simultaneously. Therefore, when the generator voltage drops below that of the battery, battery current will flow through coils 21 and 22 and coils 14 and 15 in opposite directions, thereby substantially decreasing the flux thereof, causing springs 26 and 19 to automatically open the contacts 23—24 and 14—15. However, after the contacts 23—24 are open they are held open by the spring 26, and cannot be closed again until the knob 54 is pulled outward to cause current from the generator to traverse the coils in the same direction and thereby hold the contacts closed.

If the operator desires to discontinue charging the battery at any time, he simply has to push the knob 54 inward to break the contacts 23 and 24, which are thereafter held open by means of spring 26, as pointed out above. When the contacts 23 and 24 are opened, either manually or automatically, no battery current can flow through the series coil 14 of the reverse current relay should the contacts 17 and 18 be closed accidentally by a sudden jolt or jar imparted to the motor vehicle as, for example, when landing an airplane.

It will be seen from the foregoing description that there is provided a novel charging circuit or system adapted for use particularly in aircraft, which are frequently subjected to jolts and jars, whereby accidental closing of the reverse current relay is prevented, thus preventing discharging of the battery through the generator. The mechanical embodiment of the switch which is also novel and simple in structure, thereby facilitating the assembly and manufacture thereof and reducing the cost of manufacture, is the subject of a divisional application Serial No. 558,373, filed August 20, 1931.

While only one embodiment of the invention is shown and described, various other changes in form, arrangement, and construction of parts, which will now appear to those skilled in the art, may be made without departing from the scope of the invention, and reference is therefore to be had to the appended claims for a definition of the limits of the invention.

What is claimed is:

1. In a system of the class embodying a generator, a battery adapted to be connected therewith, and a reverse current relay between the generator and battery comprising a movable switch member and series and shunt coils, the combination with said relay of means for preventing the switch member being held in closed position by the passage of heavy battery current through the series coil and including a switch required to be actuated manually for connecting the battery to the generator but responsive to a flow of battery current for automatically disconnecting the battery from the generator.

2. In a system of the type which embodies a generator, a battery adapted to be connected therewith, and a reverse current relay between the generator and battery comprising an armature and series and shunt coils, the combination with said relay of automatic means for preventing the armature being held in closed position by the passage of heavy battery current through the series coil and including a switch required to be actuated manually for connecting the battery to the generator but responsive to a flow of battery current for automatically disconnecting the battery from the generator.

3. In a charging circuit of the type embodying a generator, a battery adapted to be connected therewith, and a reverse current relay between the generator and battery comprising a pair of contacts and series and shunt coils, the combination with said relay of an electro-magnetic switch provided with a plurality of coils, and a pair of contacts required to be closed manually and adapted to be held closed by current passing from the generator to the battery, said coils being so arranged that when the generator voltage becomes less than the battery voltage said switch is automatically opened simultaneously with the reverse current relay, thereby preventing accidental closing of said relay.

4. In a charging circuit of the class including a generator, a battery adapted to be connected therewith, and a reverse current relay between the generator and battery comprising a pair of contacts and series and shunt coils, the combination with said relay of a switch required to be actuated manually to connect the battery to the generator and provided with series and shunt coils and a pair of contacts in series with said series coil, means for manually closing said contacts whereby current is caused to flow from the generator to the battery through the series coil of the switch and the series coil of the relay for respectively holding the relay contacts and the switch contacts closed, said relay and switch coils being so arranged that both pairs of contacts will open when the generator voltage drops below the battery voltage and so that the relay contacts cannot close the generator battery circuit until the switch contacts are manually re-closed.

5. In a charging circuit of the class embodying a generator, a battery adapted to be connected therewith, and a reverse current relay, the combination with said relay of an electro-magnetic switch required to be actuated manually to connect the battery to the generator but adapted to be actuated electro-magnetically for automatically opening said charging circuit when the generator voltage falls below the battery voltage, means for preventing the closing of said switch after it is opened whereby accidental closing of the relay is eliminated, and means for manually closing and opening said switch independently of the voltages as desired, said relay being ineffective until the switch is closed.

6. In a charging circuit of the class including a generator, a battery adapted to be connected therewith, and a reverse current relay between the generator and the battery comprising a pair of contacts and series and shunt coils, the combination with said relay of a switch required to be actuated manually to connect the battery to the generator and also including series and shunt coils and a pair of contacts adapted to be closed manually and opened automatically when the generator voltage falls below the battery voltage, said relay and switch coils being so arranged that said relay contacts are automatically closed upon flow of generator current, whereby said current is caused to flow through the shunt coil of the switch, and upon closing of the switch contacts the series coils of the relay and the switch are energized to hold both pairs of contacts in closed position.

7. In a charging circuit of the type embodying a generator, a battery adapted to be connected therewith, and a reverse current relay between said generator and battery, the combination with said relay of a switch required to be manually actuated to connect the battery to the generator and including a pair of contacts, means for manually opening and closing said contacts, a plurality of coils arranged so that when current flows from the generator to the battery said coils are energized in the same sense to hold said contacts closed, and when current flows from the battery to the generator upon a decrease of the generator voltage below that of the battery voltage said contacts are automatically opened, and means for maintaining said contacts in open position until they are re-closed manually against the action of said last mentioned means, whereby accidental closing of the reverse current relay is eliminated.

8. In a battery charging system, a generator, a battery adapted to be connected to said generator, a reverse current cut-out between the generator and battery and having series and shunt coils, and a switch required to be actuated manually to close the generator-battery circuit but adapted to be operated automatically when current flows from the battery to the generator for opening said circuit and for disconnecting the shunt coil from the battery.

9. In a battery charging system, a generator, a battery adapted to be connected to said generator, a reverse current cut-out having series and shunt coils connected to the generator-battery circuit, a switch required to be actuated manually for closing the generator-battery circuit and having series and shunt coils which are connected to be energized in like manner when the switch is closed manually and current is flowing from the generator to the battery but adapted to be energized in opposite senses when current flows from the battery to the generator for opening the generator-battery circuit and for disconnecting the shunt coils of the cut-out and of the switch from the battery.

10. In combination with a generator and a battery, each connected across a main circuit adapted to feed an external load, a reverse-current controlled switch located in said main circuit, a manually closable switch in series with said first-named switch, and control means responsive to an opening of said first-named switch to operate upon said second switch for maintaining said circuit open as long as the generator voltage remains below the predetermined value at which said first-named switch is opened, said control means comprising a solenoid having opposing windings, one of which tends to close said switch and the other of which tends to render the first winding ineffective.

11. In combination with a generator and a battery, each connected across a main circuit adapted to feed an external load, a reverse-current controlled switch located in said main circuit, a manually closable switch in series with said first-named switch, and control means responsive to an opening of said first-named switch to operate upon said second switch for maintaining said circuit open as long as the generator voltage remains below the predetermined value at which said first-named switch is opened, said control means comprising a solenoid having opposing windings, one of which tends to close said switch and the other of which tends to render the first winding ineffective, said second winding being in shunt with said generator and said battery.

12. In combination with a generator and a battery, each connected across a main circuit adapted to feed an external load, a reverse-current controlled switch located in said main circuit, a closable switch in series with said first-named switch, and control means responsive to an opening of said first-named switch to operate upon said second switch for maintaining said circuit open as long as the generator voltage remains below the predetermined value at which said first-named switch is opened, said control means comprising a solenoid having opposing windings, one of which tends to close said switch and the other of which tends to render the first winding ineffective, and resilient means for re-opening said second switch when the potential difference across said second winding is sufficient to neutralize the magneto-motive force of said first-named winding.

13. In combination with a generator and a battery, each connected across a main circuit adapted to feed an external load, a reverse-current controlled switch located in said main circuit, a closable switch in series with said first-named switch, control means responsive to an opening of said first-named switch to operate upon said second switch for maintaining said circuit open as long as the generator voltage remains below the predetermined value at which said first-named switch is opened, said control means comprising a solenoid having opposing windings, one of which tends to close said switch and the other of which tends to render the first winding ineffective, said second winding being in shunt with said generator and said battery, and resilient means for re-opening said second switch when the potential difference across said second winding is sufficient to neutralize the magneto-motive force of said first-named winding.

CHARLES I. McNEIL.